United States Patent [19]
House et al.

[11] Patent Number: 5,357,063
[45] Date of Patent: Oct. 18, 1994

[54] METHOD AND APPARATUS FOR ACOUSTIC ENERGY IDENTIFICATION OF OBJECTS BURIED IN SOIL

[75] Inventors: Larry J. House; Douglas B. Pape, both of Columbus, Ohio

[73] Assignee: Battelle Memorial Institute, Columbus, Ohio

[21] Appl. No.: 90,494

[22] Filed: Jul. 12, 1993

[51] Int. Cl.$^5$ .......................... G01V 1/04; H04R 1/20
[52] U.S. Cl. ...................... 181/108; 367/14; 367/68
[58] Field of Search .............. 367/37, 7, 14, 68, 31, 367/70–72; 181/108, 121, 177, 125; 73/603, 627; 381/156

[56] References Cited

U.S. PATENT DOCUMENTS

| | | | |
|---|---|---|---|
| 3,243,525 | 3/1966 | Eaton | 73/603 |
| 3,852,529 | 12/1974 | Shafft | 181/125 |
| 4,006,795 | 2/1977 | Anstey | 181/121 |
| 4,153,894 | 5/1979 | Alphonse et al. | 73/627 |
| 4,512,001 | 4/1985 | Mayne et al. | 367/189 |
| 4,694,438 | 9/1987 | Ramm et al. | 367/7 |
| 4,715,471 | 12/1987 | Fulkerson et al. | 181/121 |
| 4,850,451 | 7/1989 | Cholet et al. | 181/114 |

OTHER PUBLICATIONS

Morita, A., "Land Mine Detection System Final Report," TRW Report AT-73-2, TRW Systems Group, Feb. 23, 1973.

*Primary Examiner*—Nelson Moskowitz
*Attorney, Agent, or Firm*—Killworth, Gottman, Hagan & Schaeff

[57] ABSTRACT

Acoustic energy is used to detect and identify objects buried in soil by imaging acoustic energy reflected from the soil and buried objects. Acoustic energy is injected into soil at an oblique angle relative to the surface of the soil, reflected and received. Signals representative of the reflected energy are processed to generate image signals used to generate images representative of the reflected energy. Objects buried within the soil are identified by viewing the images. In one embodiment, obliquely oriented acoustic energy signals are carried from a source to a soil sample by a first duct and reflections of that energy are carried to a receiver within an adjacent second duct. The ducts acoustically isolate the source from the receiver. A beveled end of the first duct and the second duct are supported above the soil sample for noncontact operations. In another embodiment, an acoustic energy source is obliquely supported upon and forced into engagement with soil in a reservoir. The reservoir is placed in contact with soil to be probed to effect a soil "impedance match" for oblique injection of acoustic energy into the soil. An acoustic energy receiver contacts the soil adjacent to the reservoir to receive acoustic energy reflected from the soil and objects buried within the soil. Pulse compression increases penetration depth. To compensate for soil attenuation characteristics, frequency-swept sinusoidal acoustic energy pulses are preferably amplitude modulated to have an exponentially changing envelope.

9 Claims, 8 Drawing Sheets

METHOD AND APPARATUS FOR ACOUSTIC ENERGY IDENTIFICATION OF OBJECTS BURIED IN SOIL

BACKGROUND OF THE INVENTION

The present invention relates in general to the detection of objects buried in soil and, more particularly, to the detection and identification of buried objects using acoustic energy.

The detection of buried objects is important for numerous modern day activities including, for example, utility servicing, law enforcement, military operations, and excavations. Accordingly, a wide variety of technologies and techniques have been pursued for detection of a diversity of buried objects including pipelines, electrical utilities, cadavers, landmines, underground cavities, and tunnels.

There has been qualified success for each technology and application with detection limitations generally being related to: the physical nature of the object, in terms of size, volume and composition; the type of soil and terrain; and, the depth of the object beneath the surface of the soil. Successful applications have included ground penetrating radar to detect plastic pipes in dry soils, infrared detection of cadavers in shallow graves, and acoustic-seismic detection of a multitude of different objects buried beneath various soil types ranging from unlithified marine sediments to railroad ballast. There has been very limited success in attempts to use techniques employing mechanical radiation to detect buried pipes, archeological remains, voids under pavement, various nonmetallic objects, landmines, and cadavers.

In view of the limited success of several of the previously employed techniques, it is apparent that "sensing" an object is not the major hurdle. Instead, since numerous buried objects may be detected or sensed by a given sensing technique, a more difficult problem is the recognition or identification of an object once it has been detected. Unfortunately, the known prior art sensing arrangements have been even less successful in the identification of buried objects than in the detection of the objects.

Accordingly, there is a need for an improved arrangement for detecting and identifying objects buried in soil.

SUMMARY OF THE INVENTION

This need is met by the method and apparatus of the present invention wherein acoustic energy is used to detect and identify objects buried in soil by imaging acoustic energy reflected from the buried objects. Acoustic energy is injected into soil to be searched for buried objects with the energy being directed at an oblique angle relative to the surface of the soil. An acoustic energy receiver is positioned to receive acoustic energy reflected from the soil and objects buried therein.

The acoustic energy source and receiver are physically and electrically isolated from one another to protect the receiver from direct receipt of the acoustic energy from the source. The receiver is then able to receive and generate signals representative of reflected acoustic energy. The reflected energy signals are processed to generate image signals which in turn are used to generate images representative of the reflected energy. By viewing the resulting images, objects buried within the soil are identified.

In a first embodiment of the present invention, an acoustic energy source is obliquely oriented to generate acoustic energy signals which are carried to a soil sample to be probed by a first duct. An acoustic energy receiver is supported in a second duct adjacent to the first duct in the direction of acoustic energy injection. A beveled end of the first duct and the second duct are supported above the soil sample for noncontact sensing and identification operations.

In a second embodiment of the present invention, an acoustic energy source is obliquely supported upon a soil reservoir. Soil corresponding to the soil sample is used to fill the reservoir, and the acoustic energy source is forced into engagement with the soil in the reservoir. The reservoir is then placed in contact with the soil sample to be probed such that a soil "impedance match" is effected for oblique injection of acoustic energy into the soil sample. An acoustic energy receiver is placed in contact with the soil sample and adjacent to but not in contact with the reservoir such that it receives acoustic energy reflected from the soil sample and any objects buried within the soil sample.

To increase penetration depth while preserving depth resolution, pulse compression is included in the present invention. For pulse compression, acoustic energy injected into a soil sample takes the form of a swept sinusoid acoustic energy pulse signal. Preferably, the frequency of the swept sinusoid acoustic energy pulse signal decreases with time, i.e. each pulse of the signal contains a sinusoidal signal which is swept from the highest frequency used to the lowest frequency used. For the preferred down-sweep signal, received acoustic energy signals are processed by a filter having a time-delay characteristic which advances higher frequency components and retards the lower frequency components.

To compensate for soil attenuation characteristics or the soil transfer function, the swept sinusoidal acoustic energy pulses are preferably amplitude modulated to have an exponentially changing envelope. For the preferred down-sweep signal, the amplitude of the swept sinusoid acoustic energy pulses decreases exponentially over the periods of the pulses. The exponential amplitude modulation compensates for the soil transfer function which exponentially decreases with the frequency of the acoustic energy. Hence, since the pulse commences with higher frequency components, which are highly attenuated, and concludes with lower frequency components, which are much less attenuated, the amplitude of the transmitted pulses is initially high and exponentially decreases to the ends of the pulses. The exponential amplitude modulation of the transmitted pulses results in received acoustic energy pulses that have a generally rectangular envelope.

In accordance with one aspect of the present invention, apparatus utilizing acoustic energy for identifying objects buried in soil comprises acoustic energy source means for coupling acoustic energy into soil. The acoustic energy source means is oriented at an oblique angle relative to a surface of the soil. Acoustic energy receiver means is positioned relative to the acoustic energy source means for receiving acoustic energy reflected from the soil and objects buried in the soil. The acoustic energy receiver means is oriented substantially perpendicular to the soil surface and generates signals representative of received acoustic energy. Processor means is provided for processing the signals generated by the acoustic energy receiver means to generate image signals. Imaging means generates images representative of the received acoustic energy in response to the image signals.

In one embodiment, the acoustic energy source means comprises an acoustic energy generator, a first duct having a first end which is beveled at the oblique angle for facing the soil surface and a second end, and an exponential horn for coupling the acoustic energy generator to the second end of the first duct. For this embodiment, the acoustic energy receiver means comprises an acoustic energy receiver, and a second duct having first and second substantially square ends, the first end facing the soil surface and receiving the acoustic energy receiver therein. Preferably, the first ends of the first and second ducts are supported such that they are spaced from the soil surface.

In another embodiment, the acoustic energy source means comprises an acoustic energy generator, soil reservoir means for receiving a sample of soil to be probed, and mounting means for supporting the acoustic energy generator on the soil reservoir means at the oblique angle. The mounting means includes force exerting means for forcing the acoustic energy generator into contact with the soil sample at the oblique angle.

In accordance with another aspect of the invention, apparatus utilizing acoustic energy for identifying objects buried in soil comprises acoustic signal generator means for generating a swept sinusoid acoustic energy pulse signal. Acoustic energy source means couples acoustic energy into soil in response to the swept sinusoid acoustic energy pulse signal. The acoustic energy source means is oriented at an oblique angle relative to a surface of the soil. Acoustic energy receiver means is positioned relative to the acoustic energy source means for receiving acoustic energy reflected from the soil and objects buried in the soil. The acoustic energy receiver means is oriented substantially perpendicular to the soil surface and generates signals representative of received acoustic energy. Processor means is provided for processing the signals generated by the acoustic energy receiver means to generate image signals. Imaging means generates images representative of the received acoustic energy in response to the image signals.

The processor means includes means for filtering the received acoustic energy for pulse compression processing of the acoustic energy. Preferably, the frequency of the swept sinusoid acoustic energy pulse signal decreases with time and the amplitude of the swept sinusoid acoustic energy pulse signal decreases exponentially over the period of the pulse. The acoustic energy source means may comprise an acoustic energy generator, a first duct having a first end which is beveled at the oblique angle for facing the soil surface and a second end, and an exponential horn for coupling the acoustic energy generator to the second end of the duct.

In accordance with still another aspect of the present invention, a method for identifying objects buried in soil comprises the steps of: coupling acoustic energy into soil at an oblique angle relative to a surface of the soil; receiving acoustic energy reflected from the soil and objects buried in the soil; generating signals representative of received acoustic energy; processing the signals representative of received acoustic energy receiver means to generate image signals; and, generating images representative of received acoustic energy in response to the image signals.

The step of coupling acoustic energy into soil at an oblique angle relative to a surface of the soil may comprise the step of transmitting the acoustic energy through a first duct. The step of receiving acoustic energy reflected from the soil and objects buried in the soil may comprise the steps of: housing an acoustic energy receiver in a second duct; and, receiving the acoustic energy through the second duct.

For pulse compression, the method further comprises the steps of generating the acoustic energy in the form of a series of swept sinusoid acoustic energy pulses and filtering the received acoustic energy for pulse compression processing of the acoustic energy. Preferably, the method further comprises the step of sweeping each of the swept sinusoid acoustic energy pulses such that the frequency thereof decreases with time. To compensate for soil attenuation, the method may further comprise the step of exponentially decreasing the amplitude of the downwardly swept sinusoid acoustic energy pulses over the periods of the pulses.

It is thus an object of the present invention to provide an improved method and apparatus for detecting and identifying objects buried in soil by imaging acoustic energy reflected from the soil and objects buried within the soil; to provide an improved method and apparatus for detecting and identifying objects buried in soil by imaging acoustic energy reflected from the soil and objects buried within the soil by transmitting acoustic energy through a first duct obliquely oriented relative to the soil surface and receiving reflected acoustic energy in a second duct; to provide an improved method and apparatus for detecting and identifying objects buried in soil by imaging acoustic energy reflected from the soil and objects buried within the soil by transmitting acoustic energy via a soil reservoir which is filled with soil of the type that is to be probed; and, to provide an improved method and apparatus for detecting and identifying objects buried in soil by imaging acoustic energy reflected from the soil and objects buried within the soil by transmitting acoustic energy in the form of a swept sinusoid acoustic energy pulse signal having an exponentially changing modulation envelope which pulse signal is filtered upon receipt.

Other objects and advantages of the invention will be apparent from the following description, the accompanying drawings, and the appended claims.

DETAILED DESCRIPTION OF THE INVENTION

Figure 1:
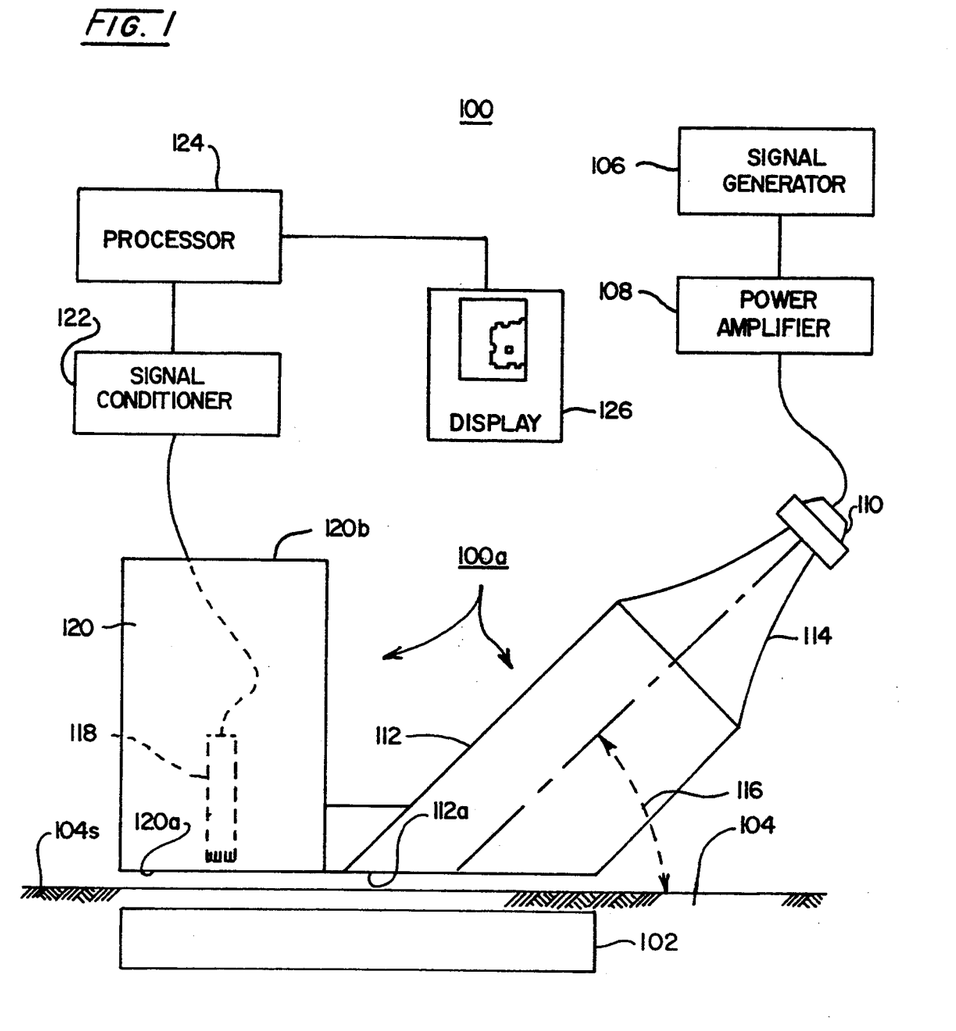
FIGS. 1 and 2 are schematic block diagrams of systems operable in accordance with the present invention for detecting and identifying objects buried in soil illustrating first and second embodiments of source/receiver configurations.
Figure 3:
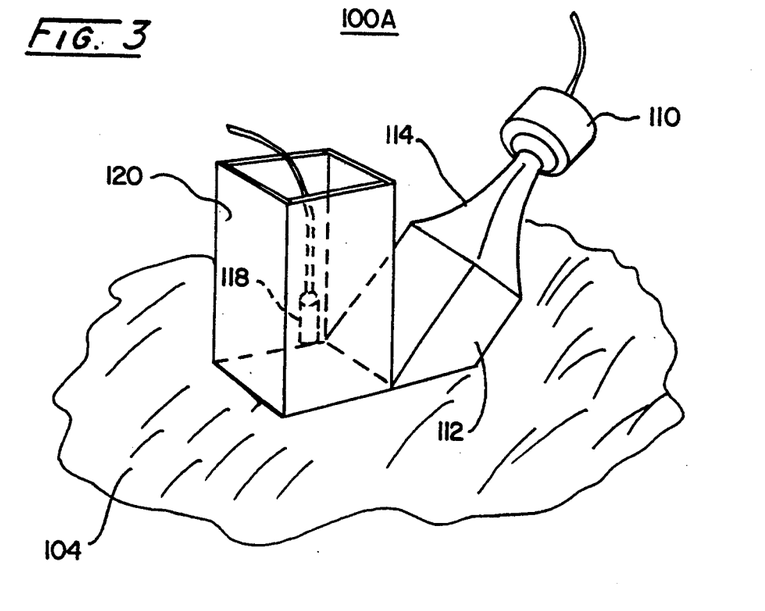
FIGS. 3 and 4 are perspective views of the source/receiver configurations of the first and second embodiments of FIGS. 1 and 2, respectively.

The invention of the present application will now be described with reference to the drawing figures wherein FIGS. 1 and 3 show a first embodiment of apparatus 100 utilizing acoustic energy for identifying an object 102 buried in soil 104. Acoustic signal generator means illustrated as a signal generator 106 in FIG. 1 provides for generating an acoustic energy signal. Preferably, the acoustic energy signal takes the form of a series of frequency-swept sinusoid acoustic energy pulses as will be described hereinafter. In tests of a working embodiment of the present invention, a LeCroy model 9100 arbitrary function generator was used as the signal generator 106.

The acoustic energy signal is amplified by a power amplifier 108 and passed to acoustic energy source means illustrated as a JBL model 2426H compression driver 110 and a first duct 112. The term duct is used herein to refer to a gas or air filled passage having a substantially constant cross section. A duct for use in the present invention may have a rectangular, substantially constant cross section, as shown in the illustrated embodiments, or any other substantially constant geometrically shaped cross section, such as circular or elliptical. The acoustic energy source means is completed by an exponential horn 114 which couples the compression driver 110 to the first duct 112. It is noted that piezoelectric resonators and other sources of acoustic energy can be used in the present invention.

The acoustic energy source means is oriented at an oblique angle 116 relative to the surface 104s of the soil 104 which is to be probed for the buried object 102. The first duct 112 has a first beveled end 112a which is oriented parallel to the surface 104s of the soil 104 to be probed. As illustrated in FIG. 1, the first beveled end 112a of the first duct 112 is spaced a small distance above the surface 104s of the soil 104. In tests of a working embodiment of the present invention, the beveled end 112a of the first duct 112 was spaced approximately 0.125 to 0.25 inch from the surface 104s of the soil 104.

Acoustic energy receiver means illustrated as a Bruel and Kjaer Type 4165, 0.5-inch-diameter microphone 118 received within a second duct 120 in FIG. 1, provides for receiving acoustic energy reflected from the soil 104 and objects buried in the soil 104, such as the object 102. The microphone 118 generates signals representative of received acoustic energy. It is noted that piezoelectric resonators and other acoustic energy receivers can be used in the present invention.

As shown, the acoustic energy receiver means is positioned adjacent to the acoustic energy source means for receiving acoustic energy originating therefrom and reflected from the soil 104 and objects buried in the soil 104. The acoustic energy source/receiver 100a of FIGS. 1 and 3 preferably are secured to one another in the orientation shown or otherwise maintained in a fixed positional relationship relative to one another.

The second duct 120 has first and second square ends 120a, 120b. As illustrated in FIG. 1, the first end 120a facing the soil is spaced a small distance above the surface 104s of the soil 104. While the second member can be spaced any reasonable distance from the soil surface 104s, in tests of a working embodiment of the present invention it was spaced the same as the beveled end 112a of the first duct 112, i.e. approximately 0.125 to 0.25 inch from the surface 104s of the soil 104. Spacing the ducts 112 and 120 from the soil surface 104s makes the acoustic energy source/receiver 100a easily movable from one point to another.

The first and second ducts 112, 120 substantially prevent high amplitude acoustic energy from the acoustic energy source from being directly coupled to the acoustic energy receiver. High amplitude acoustic energy is needed because soil highly attenuates incident acoustic waves generated by the source. If direct coupling of acoustic energy were possible, the acoustic energy receiver means would be overwhelmed by the direct acoustic energy from the source and therefore be unable to respond adequately to the acoustic energy reflected from buried objects which are to be detected. Accordingly, adequate physical separation and acoustic shielding must be provided between the source and receiver.

The small spacing between the source/receiver 100a and the soil surface 104s also helps to minimize the airborne acoustic energy emitted from the acoustic source or first duct 112 from diffracting into the acoustic receiver or second duct 120. It may also be advantageous to place high-density acoustical absorbing material in the space between the first duct 112 and the second duct 120.

The signals generated by the microphone 118 are passed to signal conditioning circuitry 122. The signal conditioning circuitry 122 amplifies, filters and converts the analog signals from the amplifier 118 to digital signals. In addition, synchronous time averaging of the waveforms is performed over a plurality of samples, 64 per soil area to be sampled in tests of a working embodiment. The resulting digital signals are passed to a processor 124 which converts the digital signals into image signals. The image signals from the processor 124 are passed to imaging means illustrated as a display 126, which can be a conventional black and white or color monitor.

In tests of a working embodiment, an 80386 processor with matching 80387 coprocessor was used for the processor 124. The images thus presented on the display 126 are evaluated by an operator of the system for detection and identification of buried objects, such as the buried object 102. Of course, an image produced using the present invention can be analyzed by further image processing, such as image enhancement and/or image recognition routines.

Figure 2:
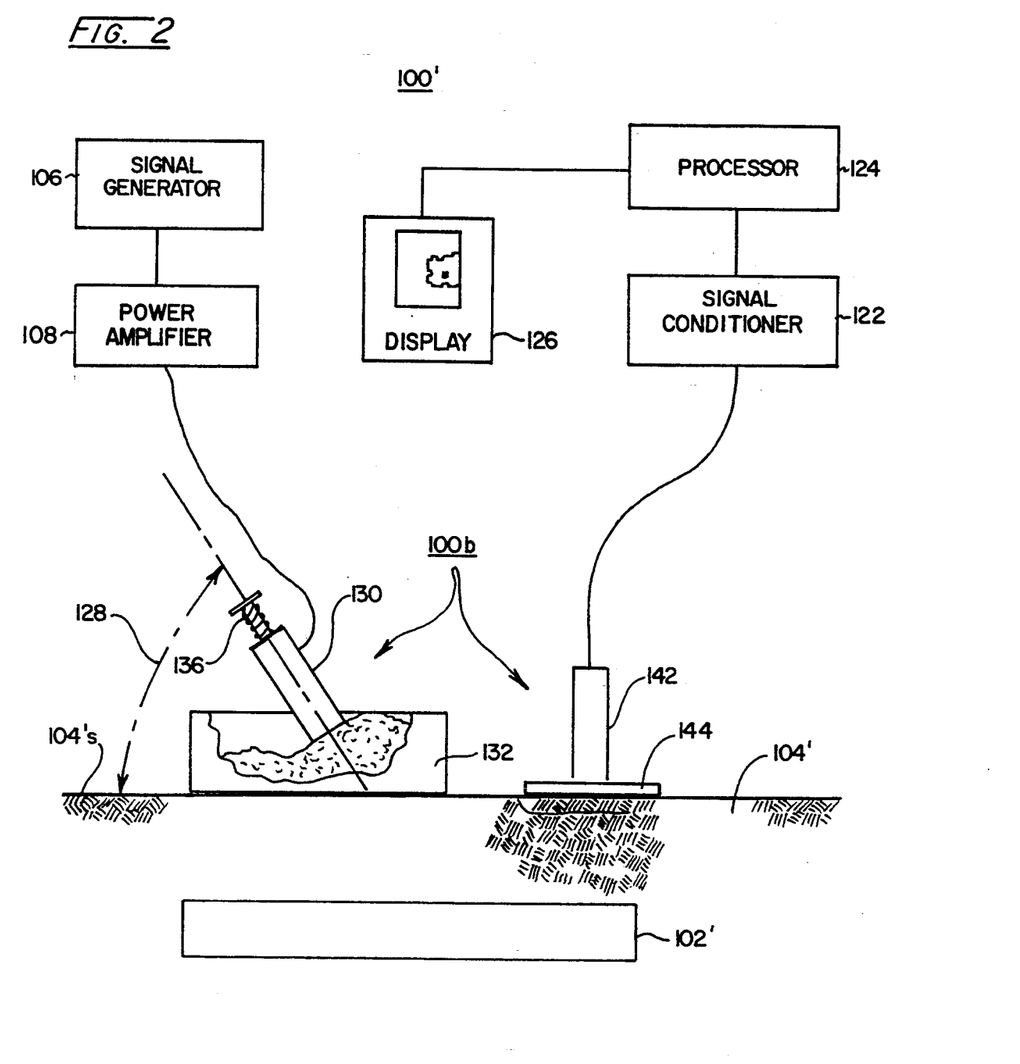
Figure 4:
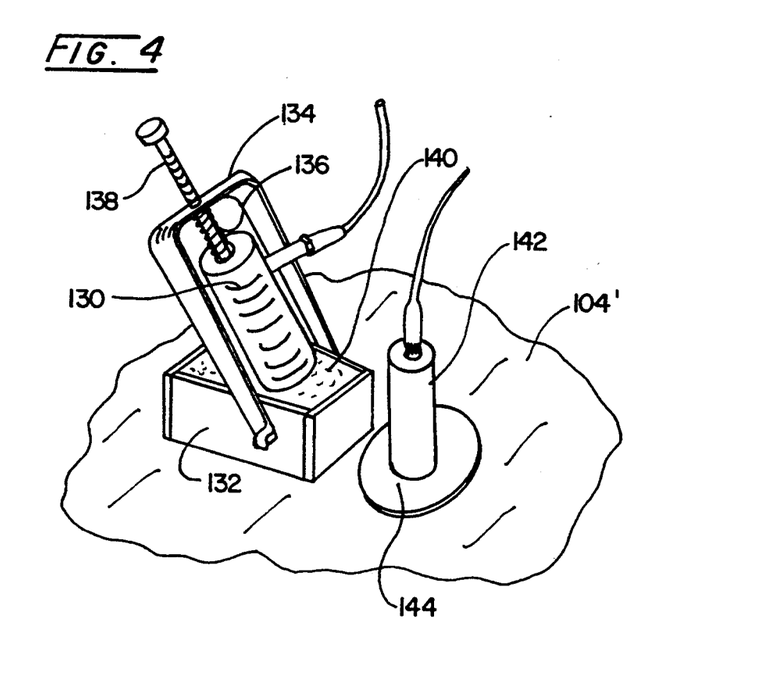

Reference will now be made to FIGS. 2 and 4 which show a second embodiment of apparatus 100' utilizing acoustic energy for identifying an object 102' buried in soil 104'. Since the second embodiment of the present invention is substantially the same as the first embodiment with the exception of the acoustic energy source/receiver 100b, its description will be limited to this portion of the apparatus 100' with the remainder of the apparatus being labeled with the same numerals as in FIG. 1 and being understood as operating substantially the same as described above relative to the first embodiment of FIG. 1.

The acoustic energy source means also is oriented at an oblique angle 128 relative to the surface 104s' of the soil 104' which is to be probed for the buried object 102'. The acoustic energy signal is amplified by a power amplifier 108 and passed to an acoustic energy generator 130 illustrated as a Hazeltine Model TR-316 Resonator assembly consisting of a mechanically loaded stack of piezoelectric annular disks.

The acoustic energy generator 130 is coupled to soil reservoir means illustrated as an open, generally rectangular box or soil reservoir 132 formed of a polymeric material, plexiglas in a working test model of this second embodiment of the invention, by mounting means illustrated as a generally u-shaped frame 134 shown in FIG. 4. The thickness of the bottom of the soil reservoir 132 was made less than a quarter wavelength to minimize the layer reflection coefficient but was thick enough to provide mechanical stiffness. Portions of the apparatus have been broken away in FIG. 2 for clarity of illustration. Force exerting means illustrated as a compression spring 136 surrounds a bolt 138 extending from the generator 130 to force or load the generator 130 at the oblique angle 128 into engagement with a sample of soil 140 which is received within the reservoir 132.

The acoustic energy receiver means illustrated as a Hazeltine Model TR-316 Resonator assembly 142 is coupled using vacuum grease to a generally circular plate 144 formed of polymeric material, such as plexiglas, in FIGS. 2 and 4, provides for receiving acoustic energy reflected from the soil 104' and objects buried in the soil 104', such as the object 102'. It is noted that other acoustic energy receivers can be used in the present invention. As shown, the acoustic energy receiver means is positioned adjacent to but not directly touching the acoustic energy source means for receiving acoustic energy originating therefrom and reflected from the soil 104' and objects buried in the soil 104'. The receiver or resonator assembly 142 generates signals representative of received acoustic energy which signals are processed and imaged as described above.

Increasing the detection range generally requires a low-frequency, resonant source, while improving axial resolution is usually accomplished with a high frequency, broad band source. since attenuation in soils increases with frequency, lower frequency signals have a greater propagation range than do higher frequency signals for a given source intensity and directivity. However, if the wavelength becomes too large compared with the cross section of an object, then the object becomes undetectable. Also, as a general rule, object features smaller than about one quarter of a wavelength are not resolvable. Therefore, the longer wavelengths associated with low frequency signals may not detect small objects or resolve structural features sufficiently for recognition. Pulse compression is a method of avoiding the penetration-resolution tradeoff. It increases penetration depth while preserving axial resolution.

Figures 5, 6:
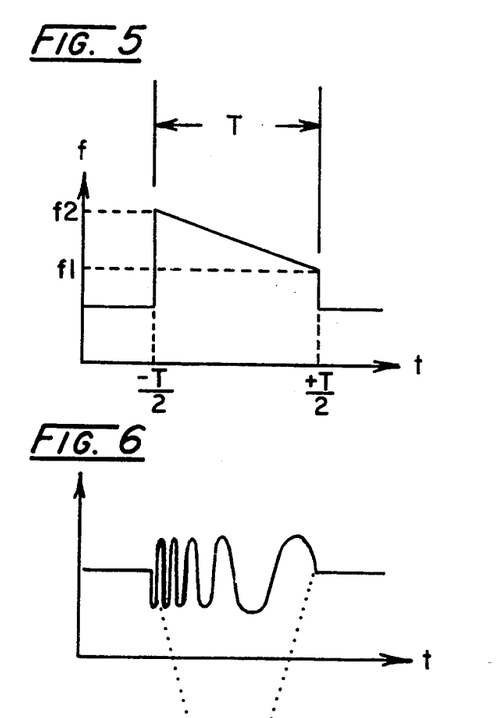
FIGS. 5-8 graphically illustrate pulse compression utilized in the present invention.
Figure 7:
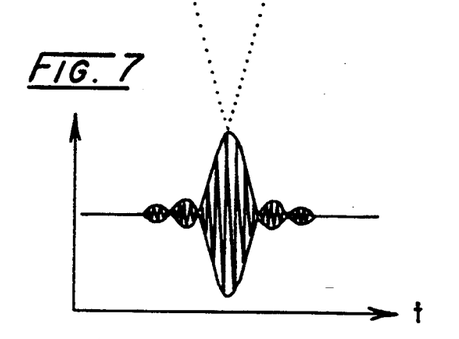
Figure 8:
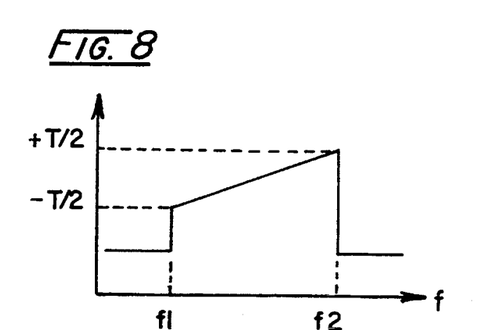

The concept of pulse compression is depicted in FIGS. 5-8. The transmitted signal is a frequency-swept sinusoid with a time window or duration of T as shown in FIG. 5. The frequency of the transmitted signal either decreases or increases with time. The frequency is shown to decrease linearly with time in FIG. 6. Compression of the received signal is accomplished by a filter that has the time-delay characteristic shown in FIG. 8. In conceptual terms, a filter having the characteristics shown in FIG. 8 advances the higher frequency components and retards the lower frequency components thus compressing or collapsing the pulse toward its center. The result, shown in FIG. 7, is a short-duration pulse that has a much higher peak amplitude than did the transmitted pulse. The theory of pulse compression is well known and will not be further described herein.

Axial/depth resolution and acoustic penetration can be improved by driving the acoustic energy source with a frequency-swept sinusoidal function and preforming pulse compression as explained in the previous paragraph. The attenuation of an elastic wave propagating in soil is frequency dependent, i.e. the attenuation coefficient increases approximately exponentially with frequency, and the amplitude of the received signal decreases with frequency. For a swept frequency input signal with a rectangular envelope, the dynamic range available to the measurement system is generally insufficient to detect the high frequencies without saturating receiving amplifiers with the low-frequency signal components.

To realize the full benefit of axial/depth resolution enhancement by pulse compression, it was necessary to develop an arrangement for receiving the full bandwidth transmitted by an acoustic energy source. To that end, the frequency dependent attenuation of the acoustic energy is treated as a soil transfer function. The acoustic energy source excitation function is then selected to compensate for the effects of the soil transfer function on the received signal. Ideally for pulse compression, the received signal is a frequency-swept sinusoidal pulse signal with a substantially rectangular envelope having the same bandwidth as the energy emitted by the acoustic energy source.

Figure 9:
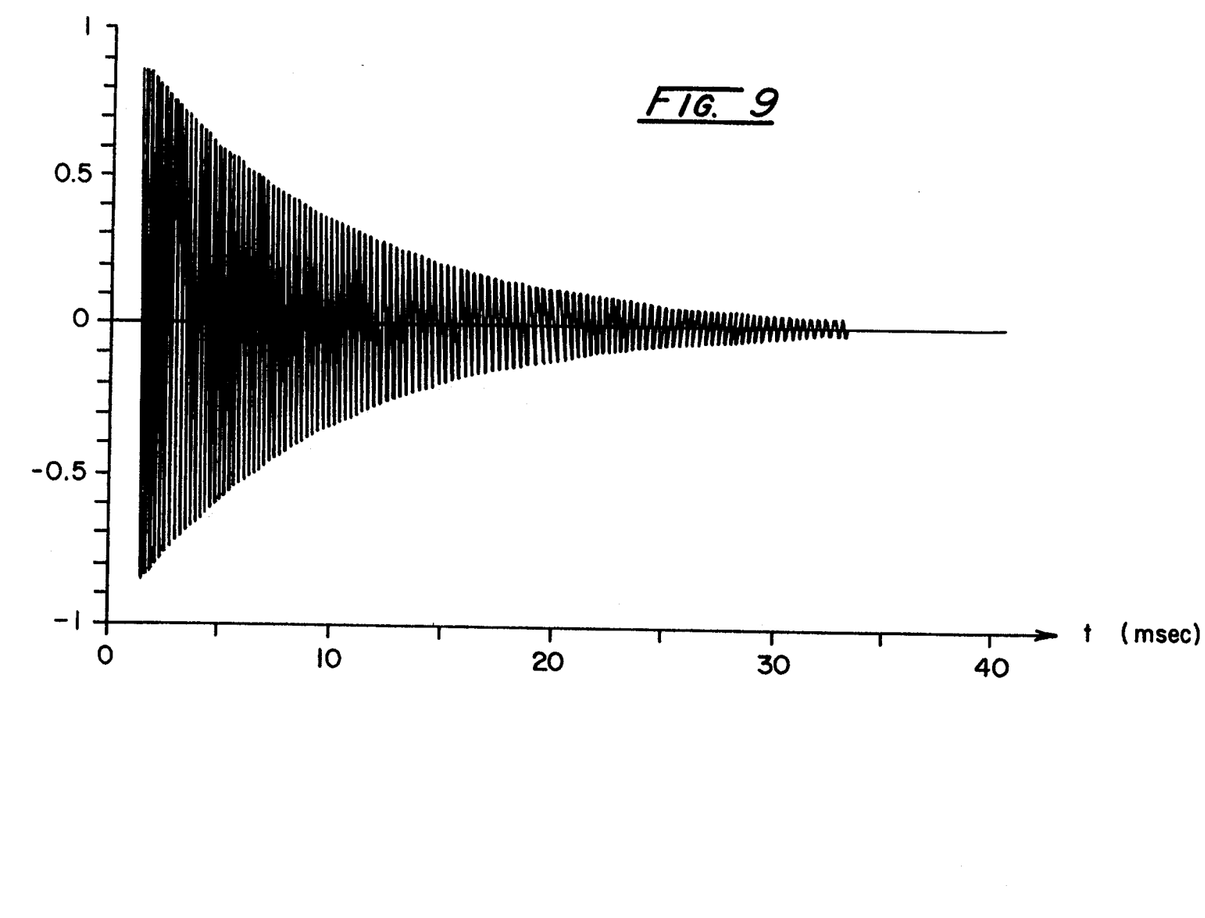
FIG. 9 is a sample waveform of an amplitude-modulated, frequency-swept sinusoidal excitation signal for use in the present invention.

The acoustic energy source excitation function necessary to compensate for the transfer function of soil and produce the desired flat frequency-swept response at the receiver was determined to be a frequency-swept sinusoidal function with an amplitude that exponentially increases with frequency, as shown in FIG. 9. Since the frequency of the signal in FIG. 9 is swept from high to low frequencies, the signal exponentially decreases as the signal progresses.

The primary importance of axial resolution is its limitation on the minimum depth at which discrimination between an object and the soil surface is possible. For target detection and recognition, a broad bandwidth, high frequency pulse is usually necessary to obtain sufficient axial and lateral resolution to discern the target boundaries. However, soil is a very attenuating, bandwidth limiting propagation medium.

The usual means of producing broad bandwidth elastic waves is to use mechanically damped, low Q, sources. These types of sources are generally ineffective for soils because of their peak power limitations and the tendency of soils to extinguish the high frequency components of the broad band pulse quickly. Instead, in the present invention, a long duration frequency-swept sinusoidal source and pulse-compression of the received signal are used. As discussed previously, pulse compression increases both soil penetration and axial/depth resolution. Axial resolution is especially important in applications such as the detection of landmines given their shallow emplacement depths which are generally on the order of three to four inches.

It was observed experimentally that sweeping upward in frequency produced ringing at the trailing edge of the compressed signal in some cases. This ringing extended over the range of times where the target signal would be expected for objects buried at shallow depths, such as landmines. Using a sinusoidal signal swept downward in frequency advanced the ringing to the leading edge of the compressed signal, thus, eliminating interference with the target signal. Accordingly, a downward swept frequency is preferred.

Signal processing performed by the signal conditioner 122 comprises digital waveform averaging which improves the target signal-to-noise ratio by minimizing nonstationary random noise. Data processing performed by the processor 124 comprises pulse compression filtering, which enhances axial resolution as previously described, and extracting signal features from the processed acoustic signals to synthesize image signals representative of buried objects. The signal amplitude, acoustic energy in a selected frequency band, and time-of-flight were used to construct isometric, false-color, and gray-scale acoustic images. It is noted that signal processing functions can be alternately divided between the signal conditioner 122 and the processor 124 if desired or necessary for alternate or enhanced implementations of the present invention.

In a test of a working embodiment of the present invention, the acoustic excitation function was swept between approximately 2.5 kHz and 10.0 kHz. To produce the desired signal at the receiver, the source function was determined to be a frequency-swept sinusoid with an exponential envelope whose amplitude increases with increasing frequency.

The synthesis of acoustic images consists of collecting waveforms in object space, transforming the waveforms into data arrays consisting of selected signal parameters and their spatial coordinates, and constructing a pictorial display of the signal parameters representing structural features of the object and its spatial frequencies. This is, in a sense, the equivalent of an ultrasonic C-scan.

The system is moved in incremental steps over an area containing a buried object. The scanning pattern is defined by a rectangular grid superimposed on the area of interest. The response of the receiver to the acoustic energy is stored at each grid point, thereby generating a two-dimensional waveform array consisting of the time domain signal and the detector spatial coordinates. Various processing operations, such as pulse compression and Fourier transformation are performed on each element of the waveform array. A two-dimensional data array, consisting of a signal parameter and its coordinates in object space, is generated from the processed waveform array.

The data array is then used to produce an image by constructing a pictorial representation of a selected signal parameter such as frequency domain amplitude, time-of-flight, integrated frequency band, etc., in a two dimensional image plane. A display or pictorial representation of the signal parameter is then produced by assigning the relative magnitude of the parameter to a false-color palette or gray-scale value and plotting the resulting colors or grays in a two-dimensional map. Alternatively, an isometric image of the buried target can be depicted by a three-dimensional plot of the magnitude of the selected parameter as a function of its coordinates on the data acquisition grid.

Several waveform parameters were used to synthesize acoustic-seismic images of buried landmines. It was found that different parameters produced higher contrast target images, i.e., a clearer more prominent picture delineating the landmine, depending primarily on the placement depth of the landmine.

The maximum amplitude in the time domain waveform was detected and stored at a location in a data array defined by the acquisition grid coordinates at which the waveform was collected. The time delay of the peak pressure amplitude in the compressed signal was determined and stored at a location in a data array corresponding to its acquisition coordinates. The time delay of the peak amplitude was measured relative to the source signal trigger.

Examples of images generated in accordance with the present invention for a test conducted to detect plastic and metallic landmines are shown in FIGS. 10–13. The images of FIGS. 10–13 were generated from data collected using the detector configuration of FIGS. 1 and 3 for landmines buried in pea gravel. The acquisition parameters for the images generated from this data are given in the following table:

| | |
|---|---|
| Acquisition grid increment | 1.0 inch |
| Signal parameter | Time-of-flight |
| Target depth | 2.0 inches |
| Soil type | Pea gravel |
| Source excitation function | Exponential AM swept sinusoid from 20 kHz to 5 kHz |

Figure 10:
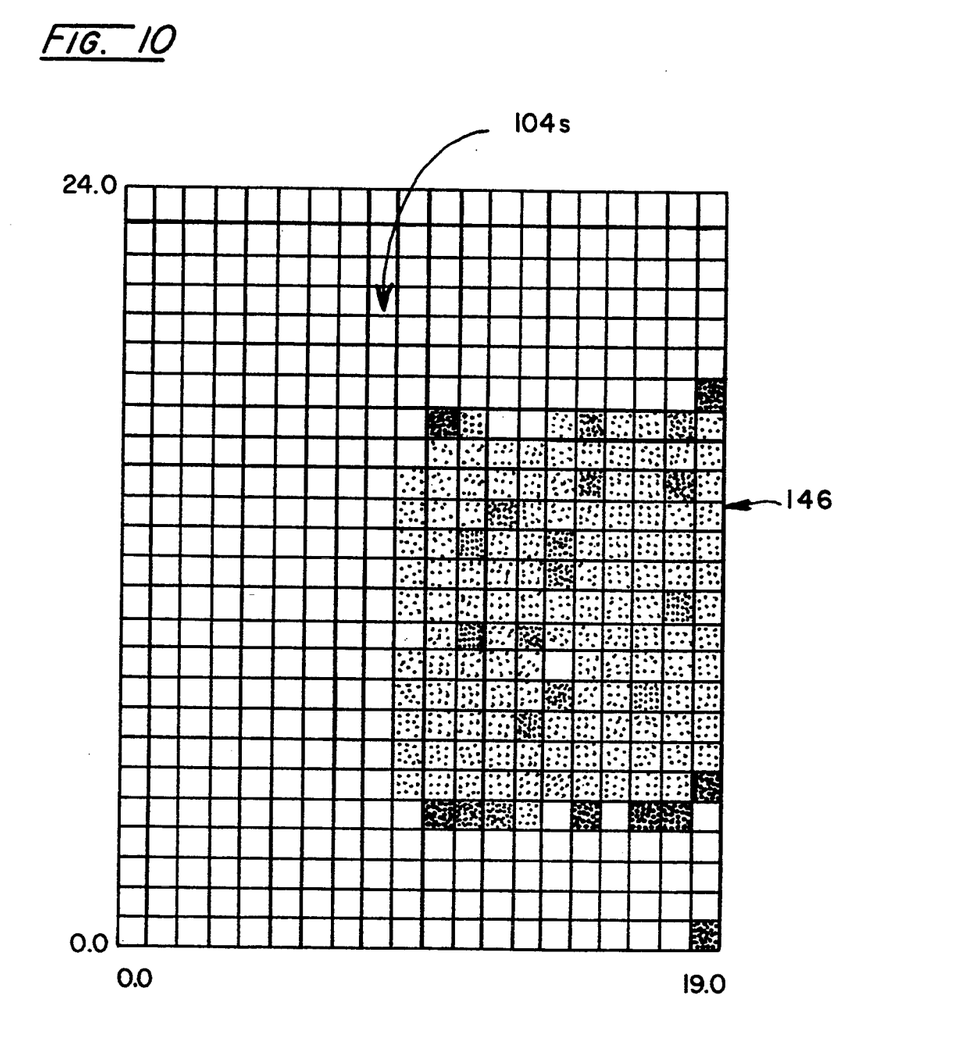
FIGS. 10 and 11 are representative gray-scale images of buried objects detected and identified using the present invention; and, FIGS. 12 and 13 are isometric images of the buried objects of FIGS. 10 and 11.
Figure 11:
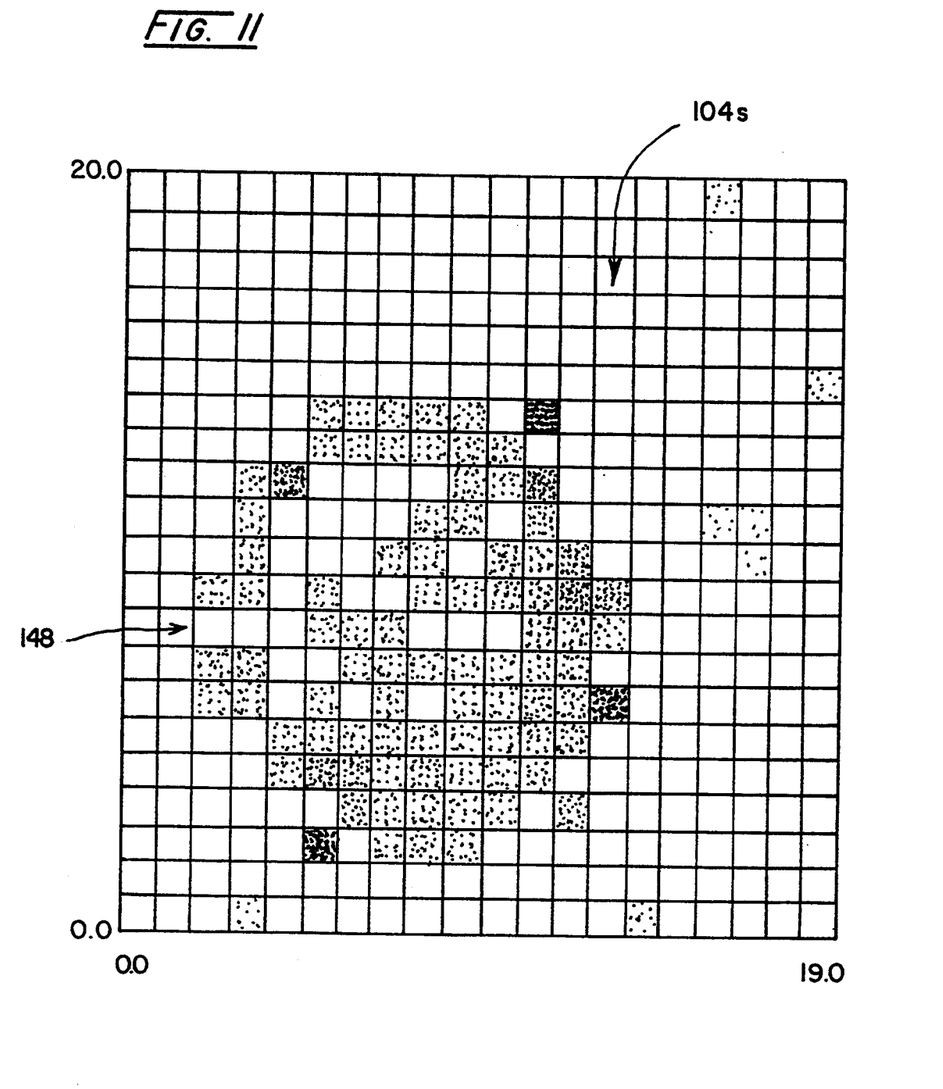
Figure 12:
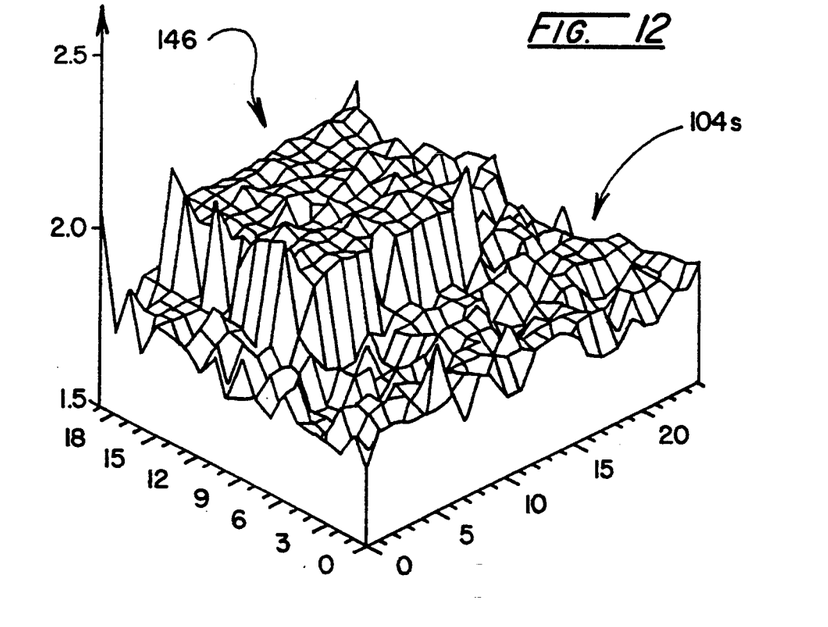
Figure 13:
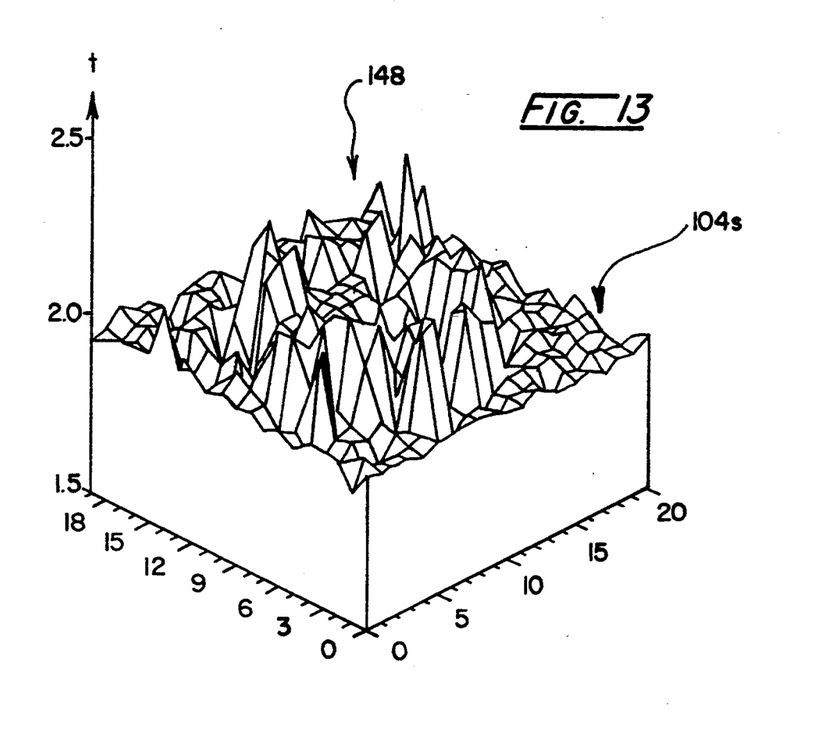

The images of FIGS. 10 and 11 are gray-scale images 146, 148 of plastic and metallic landmines and, in both images, the rectangular and circular shapes characteristic of the two objects are easily recognized. The remaining area in the images of FIGS. 10 and 11 represent soil surface 104s. FIGS. 12 and 13 illustrate an alternative imaging form, isometric imaging, of the plastic and metallic landmines of FIGS. 10 and 11, respectively. Here again, in both images, the rectangular and circular shapes characteristic of the two objects are easily recognized.

The signal parameter used to generate an image affects the target contrast depending on the target emplacement depth. For example, images based on time-of-flight for a plastic landmine buried two inches deep in pea gravel, provided better image contrast than other parameters.

On the other hand, when a target was either very near the soil surface or flush with the soil surface, it was found that time-of-flight provided poor image contrast and signal parameters related to the total reflected energy, e.g. integrated low, high, and two octave frequency bands, provided better target contrast.

The gray-scale images presented in FIGS. 10 and 11 were generated by assigning the magnitude of the selected waveform parameter, time-of-flight, to a pixel brightness with darker pixels corresponding to longer times of flight, indicating deeper reflectors. The locations of the pixels were mapped according to the corresponding acquisition grid locations of the waveform parameters represented by the pixels. False-color images can be generated in the same fashion except that the colors of the pixels are determined by the magnitude of the waveform parameter.

In general the gray-scale images are preferred since they were found to be more useful for target recognition than the false-color images. Target recognition in false-color images required greater care in selecting the numerical scale used to map the waveform parameter onto the false-color palette. In the gray-scale images it was only necessary to assure that the gray scale range corresponded to the dynamic range of the particular signal parameter used to synthesize the image.

Having thus described the invention of the present application in detail and by reference to preferred embodiments thereof, it will be apparent that modifications and variations are possible without departing from the scope of the invention defined in the appended claims. For example, while the invention was described relative to embodiments wherein the acoustic energy source is oriented oblique to the soil surface and the receiver perpendicular to the surface, alternate angular orientations of the source and receiver are possible.

What is claimed is:

1. Apparatus utilizing acoustic energy for identifying objects buried in soil comprising:
   acoustic energy source means for coupling acoustic energy into soil, said acoustic energy source means being oriented at an oblique angle relative to a surface of said soil and comprising:
   an acoustic energy generator;
   a first duct having a first end which is beveled at said oblique angle for facing said soil surface and a second end; and
   an exponential horn for coupling said acoustic energy generator to the second end of said first duct;
   acoustic energy receiver means positioned relative to said acoustic energy source means for receiving acoustic energy reflected from said soil and objects buried in said soil, said acoustic energy receiver means being oriented substantially perpendicular to said soil surface and generating signals representative of received acoustic energy and comprising:
   an acoustic energy receiver; and
   a second duct having first and second substantially square ends, said first end facing said soil surface and receiving said acoustic energy receiver therein;
   processor means for processing said signals generated by said acoustic energy receiver means to generate image signals; and
   imaging means for generating images representative of said received acoustic energy in response to said image signals.

2. Apparatus utilizing acoustic energy for identifying objects buried in soil as claimed in claim 1 wherein said first ends of said first and second ducts are supported such that they are spaced from said soil surface.

3. Apparatus utilizing acoustic energy for identifying objects buried in soil comprising:
   acoustic energy source means for coupling acoustic energy into soil, said acoustic energy source means being oriented at an oblique angle relative to a surface of said soil and comprising:
   an acoustic energy generator;
   soil reservoir means for receiving a sample of soil to be probed; and
   mounting means for supporting said acoustic energy generator on said soil reservoir means at said oblique angle, said mounting means including force exerting means for forcing said acoustic energy generator into contact with said soil sample at said oblique angle;
   acoustic energy receiver means positioned relative to said acoustic energy source means for receiving acoustic energy reflected from said soil and objects buried in said soil, said acoustic energy receiver means being oriented substantially perpendicular to said soil surface and generating signals representative of received acoustic energy;
   processor means for processing said signals generated by said acoustic energy receiver means to generate image signals; and
   imaging means for generating images representative of said received acoustic energy in response to said image signals.

4. Apparatus utilizing acoustic energy for identifying objects buried in soil comprising:
   acoustic signal generator means for generating a swept sinusoid acoustic energy pulse signal, said swept sinusoid acoustic energy pulse signal having a frequency which decreases with time and an amplitude which decreases exponentially over the period of said pulse;
   acoustic energy source means for coupling acoustic energy into soil in response to said swept sinusoid acoustic energy pulse signal, said acoustic energy source means being oriented at an oblique angle relative to a surface of said soil;
   acoustic energy receiver means positioned relative to said acoustic energy source means for receiving acoustic energy reflected from said soil and objects buried in said soil, said acoustic energy receiver means being oriented substantially perpendicular to said soil surface and generating signals representative of received acoustic energy;
   processor means for processing said signals generated by said acoustic energy receiver means to generate image signals; and
   imaging means for generating images representative of said received acoustic energy in response to said image signals.

5. Apparatus utilizing acoustic energy for identifying objects buried in soil as claimed in claim 4 wherein said processor means includes means for filtering said received acoustic energy for pulse compression processing of said acoustic energy.

6. Apparatus utilizing acoustic energy for identifying objects buried in soil as claimed in claim 5 wherein said acoustic energy source means comprises:
   an acoustic energy generator;
   a first duct having a first end which is beveled at said oblique angle for facing said soil surface and a second end; and
   an exponential horn for coupling said acoustic energy generator to the second end of said first duct.

7. Apparatus utilizing acoustic energy for identifying objects buried in soil as claimed in claim 6 wherein said acoustic energy receiver means comprises:
   an acoustic energy receiver; and
   a second duct having first and second substantially square ends, said first end facing said soil surface and receiving said acoustic energy receiver therein.

8. Apparatus utilizing acoustic energy for identifying objects buried in soil as claimed in claim 7 wherein said first ends of said first and second ducts are supported such that they are spaced from said soil surface.

9. Apparatus utilizing acoustic energy for identifying objects buried in soil as claimed in claim 5 wherein said acoustic energy source means comprises:
   an acoustic energy generator;
   soil reservoir means for receiving a sample of soil to be probed; and
   mounting means for supporting said acoustic energy generator on said soil reservoir means at said oblique angle, said mounting means including force exerting means for forcing said acoustic energy generator into contact with said soil sample at said oblique angle.

* * * * *